United States Patent [19]
Hakim et al.

[11] 3,877,137

[45] Apr. 15, 1975

[54] METHOD OF MAKING IMPLANTABLE PRESSURE SENSOR

[75] Inventors: Salomon Hakim, Bogota, Columbia; Donald L. Harris, Miami Beach, Fla.

[73] Assignee: Hakim Company Limited, Saint Vincent, British W. Indies

[22] Filed: May 30, 1974

[21] Appl. No.: 474,518

[52] U.S. Cl. ............... 29/463; 29/454; 128/2.05 E; 128/350 R; 264/232; 264/238; 264/DIG. 80
[51] Int. Cl. ............................................ B21d 39/02
[58] Field of Search ............... 29/463, 454, 421 R; 264/232, 340, 344, 238, DIG. 80; 156/145, 155, 229; 128/350 R, 350 V, 2.05 D, 2.05 E, 2 R

[56] References Cited
UNITED STATES PATENTS

| | | | |
|---|---|---|---|
| 2,991,763 | 7/1961 | Marette | 29/454 X |
| 3,111,125 | 11/1963 | Schulte | 128/350 V |
| 3,601,128 | 8/1971 | Hakim | 128/350 R |

*Primary Examiner*—C. W. Lanham
*Assistant Examiner*—Victor A. Di Palma
*Attorney, Agent, or Firm*—Kenway & Jenney

[57] ABSTRACT

In the implantable pressure sensor disclosed herein, a radio-opaque liquid is contained within a resiliently compressible vessel of a silastic material, i.e. a silicone rubber, the volume of liquid actually contained within the vessel being then variable as a function of the pressure or force applied to the vessel. The silastic is rendered impervious to the radio-opaque liquid by a treatment which involves expanding and saturating the cured silastic with a mixture of a hydrocarbon solvent such as heptane containing a dissolved wax such as beeswax. The solvent expands and saturates the silastic, carrying beeswax into the silastic. When the solvent evaporates, the beeswax is then trapped within the interstices of the silastic, under tension.

3 Claims, 2 Drawing Figures

METHOD OF MAKING IMPLANTABLE PRESSURE SENSOR

BACKGROUND OF THE INVENTION

This invention relates to an implantable pressure sensor and more particularly to such a sensor which can be read by means of X-ray techniques.

In various medical diagnostic and treatment techniques, it is desirable to measure and/or sense pressures and forces within the body of the patient. For example, in patients with hydrocephalus, it may be highly useful to know the hydrostatic pressure of CSF (cerebral spinal fluid) within the ventricles inside the patient's skull. Likewise, in the treatment of hydrocephalus, it is useful to sense the force or pressure exerted by the brain against the skull and to control the venting of CSF from the ventricles in accordance with the techniques disclosed in the application of Salomon Hakim entitled Ventricular Shunt Having a Variable Pressure Valve, Ser. No. 280,451 filed Aug. 14, 1972.

Among the several objects of the present invention may be noted the provision of a pressure sensor which is implantable within a patient undergoing diagnosis or treatment; the provision of such a sensor which employs only materials which are non-reactive with body fluids; the provision of such a sensor which is reliable and long-lived and which is of relatively simple and inexpensive construction. Other objects and features will be in part apparent and in part pointed out hereinafter.

SUMMARY OF THE INVENTION

Briefly, an implantable pressure sensor in accordance with the present invention comprises a vessel of a silastic material which can be compressed by applied force or pressure. The vessel contains a filling of a fluid which can be displaced by such compression, the fluid preferably being a non-toxic, radio-opaque material. The walls of the silastic material are rendered substantially impervious to the fluid by soaking the cured silastic material in a mixture of hydrocarbon solvent and a wax. After the solvent is allowed to evaporate, the wax is held by tension in the silastic matrix, rendering the vessel substantially impervious to the liquid.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
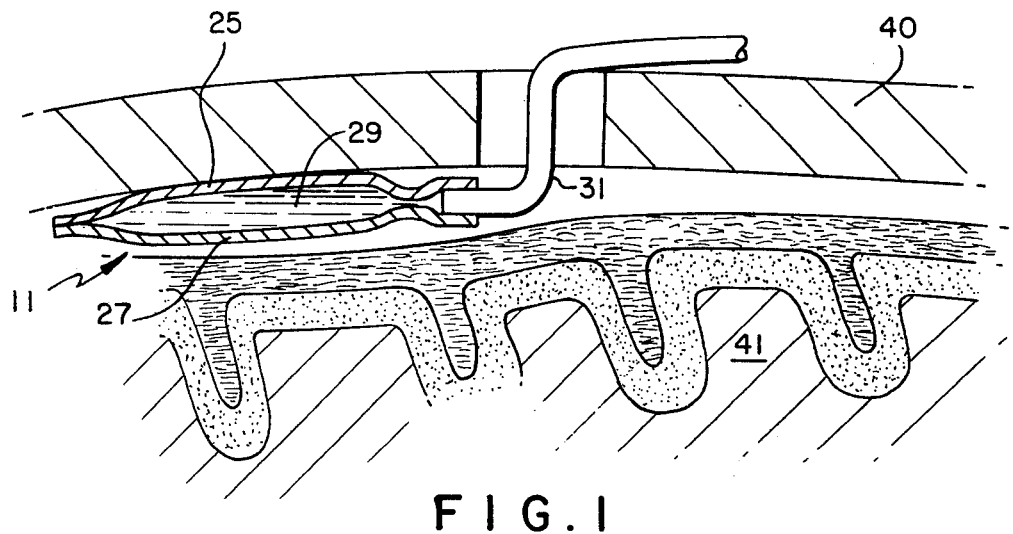
FIG. 1 is a side view, in section, of an implanted pressure-measuring sensor in accordance with the present invention.

Referring now to FIG. 1, there is indicated at 11 a compressible vessel in the form of a bulb or bladder constructed of silastic, i.e. silicone rubber. The vessel may be formed by joining, around their peripheries, a pair of disk-like sheets of silastic material 25 and 27, the intermediate space being filled with a suitable hydraulic fluid 29 which is preferably radio-opaque. At one side of the sensor, the space between the sheets 25 and 27 communicates with a tube or conduit 31 through which pressures or forces sensed by the bladder may be communicated to apparatus for utilizing fluid displaced from the vessel by applied pressure or force.

A preferred use for the sensor of FIG. 1 is as a pressure or force sensor in a hydraulic servo system i.e. of the type disclosed in application Ser. No. 280,451, referred to previously. The vessel 11 may be implanted between the skull 40 and brain 41 of a patient suffering from hydrocephalus with the tubing 31 leading outside the skull, as indicated. In such a case, the displaced liquid may operate a bellows which affects the operation of a servo-valve, as disclosed in said pending application.

A suitable material for the sheets 25 and 27 is Dow Corning MDX-4-4514, assembly being with Dow Corning silastic medical adhesive Type A. These same materials may also be used for forming conduits and other components of the servo-valve system.

Figure 2:
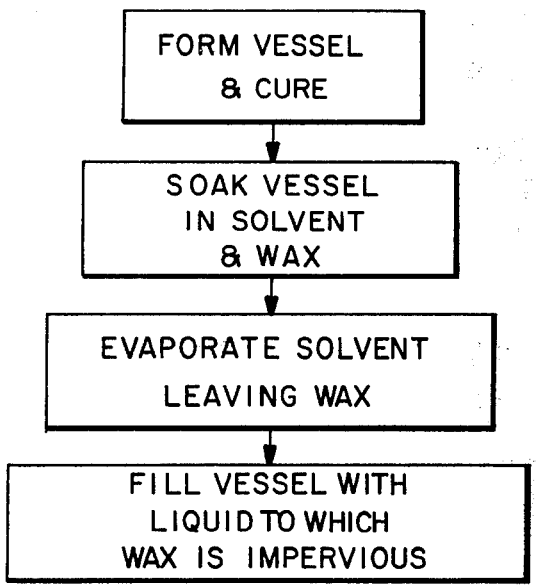
FIG. 2 is a chart illustrating steps in a process of treating a silastic material in accordance with the present invention.

A preferred radio-opaque material with which to fill the vessels of FIGS. 1 and 2 is Lipiodol F, a contrast medium manufactured and sold as an article of commerce by:

Laboratoiers André Guerbert and Cie A. Guebert Pharmacien 22, Rue Du Landy Saint Quen, Paris, Mon 2256

This material is a popular contrast media employed in mielography and, as is understood by those skilled in the art, is essentially non-toxic and non-reactive with body fluids, being in fact injectable directly into the cerebrospinal fluid of the patient's spinal subarachnoid space or ventricular cavities for contrast studies. Similar such media are known in the art, e.g. ethyl iodophenyl undecylate.

To render the walls of the silastic vessel impervious to the radio-opaque liquid, the silastic is impregnated with a wax which is impervious to the liquid by a method which effectively encapsulates the wax under tension in the silastic matrix, as illustrated in FIG. 2. In the case of Lipiodol F, the preferred radio-opaque liquid, a preferred wax is beeswax.

To treat a silastic vessel, the vessel is soaked in a mixture of the wax in a suitable hydrocarbon solvent. In the case of the beeswax which is used with Lipiodol F, a suitable solvent is heptane. The solvent substantially expands the silastic matrix and the wax which is dissolved in the solvent permeates substantially throughout the walls of the vessel. After thorough soaking, the silastic vessel is removed from the solvent mixture and the solvent is allowed to evaporate. Upon evaporation of the solvent, the silastic tends to contract toward its original size, effectively encapsulating the wax in the interstices of the silastic matrix, the wax being under compression while the silastic material itself is under tension. Encapsulating the wax by this method renders the silastic material substantially impervious to the radio-opaque liquid for an indefinite period, so that the sensors are suitable for implantation and are able to function for usefully long periods, barring physical damage.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. The method of making an implantable pressure sensor, said method comprising:
    forming a silastic material into the form of a vessel and curing said material;
    soaking the cured silastic vessel in a mixture of a hydrocarbon solvent and a wax;
    removing the vessel from said mixture and allowing the absorbed solvent to evaporate; and
    at least partially filling said vessel with a liquid, the liquid being displaceable with respect to the vessel in response to pressure applied to said vessel.

2. The method of making an implantable pressure sensor, said method comprising:
    forming a silastic material into the form of a vessel and curing said material;
    soaking the cured silastic vessel in a hydrocarbon solvent containing dissolved beeswax;
    removing the vessel from said mixture and allowing the absorbed solvent to evaporate; and
    at least partially filling said vessel with the liquid, Lipodol F, the liquid being displaceable with respect to the vessel in response to pressures applied to said vessel.

3. The method of claim 2 wherein said solvent is heptane.

* * * * *